United States Patent
Wang et al.

(10) Patent No.: US 12,072,298 B2
(45) Date of Patent: Aug. 27, 2024

(54) WALL-CLIMBING ROBOT SYSTEM AND METHOD FOR RAPID NONDESTRUCTIVE INSPECTION OF HIDDEN DEFECTS IN CULVERTS AND SLUICES

(71) Applicant: SHANDONG UNIVERSITY, Shandong (CN)

(72) Inventors: Zhengfang Wang, Jinan (CN); Jing Wang, Jinan (CN); Wenqiang Kang, Jinan (CN); Hanchi Liu, Jinan (CN); Yuzhuang Wan, Jinan (CN); Qingmei Sui, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 17/765,215

(22) PCT Filed: Aug. 9, 2021

(86) PCT No.: PCT/CN2021/111595
§ 371 (c)(1),
(2) Date: Mar. 30, 2022

(87) PCT Pub. No.: WO2022/156192
PCT Pub. Date: Jul. 28, 2022

(65) Prior Publication Data
US 2024/0068951 A1 Feb. 29, 2024

(30) Foreign Application Priority Data

Jan. 19, 2021 (CN) .......................... 202110071015.7
Jun. 24, 2021 (CN) .......................... 202110706142.X

(51) Int. Cl.
*G01N 21/88* (2006.01)
*B25J 11/00* (2006.01)
(Continued)

(52) U.S. Cl.
CPC .......... *G01N 21/8851* (2013.01); *B25J 11/00* (2013.01); *B62D 57/024* (2013.01);
(Continued)

(58) Field of Classification Search
CPC ...... B25J 15/0616; B25J 11/00; Y10S 901/01; Y10S 901/40; Y10S 901/44;
(Continued)

(56) References Cited

U.S. PATENT DOCUMENTS

2019/0077472 A1    3/2019   Harris et al.
2019/0353819 A1   11/2019   Wang et al.
2022/0177060 A1*   6/2022   Kikuchi ............... B62D 57/024

FOREIGN PATENT DOCUMENTS

CN         105891454 A      8/2016
CN         205554355 U      9/2016
(Continued)

OTHER PUBLICATIONS

Nov. 12, 2021 Search Report issued in International Patent Application No. PCT/CN2021/111595.
(Continued)

*Primary Examiner* — Spencer D Patton
(74) *Attorney, Agent, or Firm* — Oliff PLC

(57) ABSTRACT

A wall-climbing robot system and method for rapid nondestructive inspection of hidden defects in culverts and sluices. The system includes: a robot vehicle body; navigation positioning system and moving system, both mounted on the robot vehicle body; automatic knock inspection system, mounted at the vehicle body front end; mobile ultrasonic rapid inspection system and corrosion inspection system, dual-power system, formed by a non-contact negative pressure adsorption apparatus and rotor booster apparatuses, the non-contact negative pressure adsorption apparatus mounted on the vehicle body bottom, the rotor booster apparatuses (Continued)

mounted on two sides of the vehicle body; and a master controller, communicating with the navigation positioning system, moving system, automatic knock inspection system, mobile ultrasonic rapid inspection system, corrosion inspection system, and dual-power system. The system recognizes positions and categories of internal defects from ultrasonic data and perform concrete permittivity inversion and disease recognition on arbitrary length-continuous survey line ground-penetrating radar data.

18 Claims, 6 Drawing Sheets

(51) Int. Cl.
*B62D 57/024* (2006.01)
*G01N 15/08* (2006.01)
*G01N 29/04* (2006.01)
*G01N 29/265* (2006.01)
*G01N 29/44* (2006.01)
*G01S 13/89* (2006.01)
*G01S 17/89* (2020.01)

(52) U.S. Cl.
CPC ........... *G01N 15/08* (2013.01); *G01N 29/043* (2013.01); *G01N 29/265* (2013.01); *G01N 29/4454* (2013.01); *G01S 13/89* (2013.01); *G01S 17/89* (2013.01); *G01N 2291/0232* (2013.01); *G01N 2291/0289* (2013.01); *G01N 2291/2698* (2013.01)

(58) Field of Classification Search
CPC .... B62D 55/265; B62D 57/024; B62D 57/04; G01N 21/8851; G01N 15/08; G01N 29/043; G01N 29/265; G01N 29/4454; G01N 2291/0232; G01N 2291/0289; G01N 2291/2698; G01S 13/89; G01S 17/89

See application file for complete search history.

(56) References Cited

FOREIGN PATENT DOCUMENTS

| | | | |
|---|---|---|---|
| CN | 109795571 A | * | 5/2017 |
| CN | 207207653 U | | 4/2018 |
| CN | 108731736 A | | 11/2018 |
| CN | 109324112 A | | 2/2019 |
| CN | 109324121 A | | 2/2019 |
| CN | 109459494 A | | 3/2019 |
| CN | 109794945 A | | 5/2019 |
| CN | 109795571 A | | 5/2019 |
| CN | 209745884 U | | 12/2019 |
| CN | 110865128 A | | 3/2020 |
| CN | 110920875 A | | 3/2020 |
| CN | 111751392 A | | 10/2020 |
| CN | 111781576 A | | 10/2020 |
| CN | 112917483 A | | 6/2021 |

OTHER PUBLICATIONS

Nov. 12, 2021 Written Opinion of the International Searching Authority issued in International Patent Application No. PCT/CN2021/111595.

Jan. 6, 2022 Office Action and Search Report issued in Chinese Patent Application No. 202110071015.7.

* cited by examiner

WALL-CLIMBING ROBOT SYSTEM AND METHOD FOR RAPID NONDESTRUCTIVE INSPECTION OF HIDDEN DEFECTS IN CULVERTS AND SLUICES

TECHNICAL FIELD

The present invention relates to the field of nondestructive inspection, and in particular, to a wall-climbing robot system and a method for rapid nondestructive inspection of hidden defects in culverts and sluices.

BACKGROUND

The description in this section merely provides background information related to the present disclosure and does not necessarily constitute the prior art.

A sluice is a low-head water retaining or discharge project built on a river channel or an embankment. During the flood season, the sluice cooperates with the river channel, the embankment, and drainage and water storage projects to control water flow. During the construction of culverts and sluices, there are construction defects in concrete, for example, voids, cracks, and other appearance quality defects. During the use of culverts and sluices, diseases such as carbonation of concrete, corrosion of steel bars, cracks, or chloride ion erosion often occur. Over time, most hydraulic structures including culverts and sluices are prone to increasingly severe aging and diseases during use. Safety hazards of culverts and sluices are serious, and there are numerous dangerous culverts and sluices. To prevent the occurrence of disasters, it is urgent to perform comprehensive inspection of hidden defects in culverts and sluices.

Existing inspection methods for the safety of culverts and sluices include a rebound method, an ultrasonic-rebound synthesis method, a core drilling method, and the like. All the methods need to be completed manually. However, there are disadvantages in the existing methods. In one aspect, manual inspection is time consuming, laborious, and somewhat dangerous. In another aspect, culverts and sluices are prone to damage. In addition, sensors may be mounted to perform inspection on culverts and sluices. However, only local inspection can be performed on culverts and sluices, but all-around inspection cannot be implemented. Currently, existing devices such as ground-penetrating radars and ultrasonic detectors have been applied to detection of internal structure of concrete and can achieve an adequate effect. Inspection methods using robots mounted with instruments and devices are in constant development. For example, Hohai University proposes, in the patent document "Sluice gate inspection robot and inspection method based on a giant magnetoresistance element" (Patent Application No.: 201811173150.7, Filing Date: Oct. 9, 2018, Application Publication No.: CN109324112A) filed by the university, to mount a magnetic flaw inspection sensor on an inspection robot to inspect defects on the surface of a sluice gate. However, the sensor cannot inspect diseases such as voids and corrosion of steel bars inside the sluice gate, and an inspection speed is slow. An inspection robot designed by Hohai University in the patent document "Sluice gate inspection device and inspection method based on a phased array ultrasonic flaw inspector" (Patent Application No.: 201811172523, Filing Date: Oct. 9, 2018, Application Publication No.: CN109324121A) filed by the university is mounted with an ultrasonic phased array matrix probe and can perform scan inspection. However, the method cannot complete rapid general survey and has low inspection efficiency. Shandong University uses, in the patent document "Automatic wall-climbing radar photoelectric robot system for nondestructive detection and diagnosis of bridge and tunnel structure diseases" (Patent Application No.: 201810565136, Filing Date: Jun. 4, 2018, Application Publication No.: CN108731736A) filed by the university, reverse thrust of a rotor system to make a robot stick to the surface of a bridge and tunnel structure to inspect internal diseases. Due to limited reverse thrust, it is difficult to mount a variety of devices in this technology.

Recognition of hidden defects in culverts and sluices based on a ground-penetrating radar is a key link of a system. With the rapid development of new generation of information technologies, technologies such as signal processing, image processing, and artificial intelligence are used at home and abroad for automatic interpretation based on a ground-penetrating radar profile. The research mainly focuses on target recognition based on ground-penetrating radar images. A recognition method includes Hough transform, wavelet transform, a support vector machine, clustering, a convolutional neural network, and other methods, and can locate a category and an approximate position of a target body, but cannot estimate accurate morphology of the target body. Moreover, there are the following problems when the foregoing methods are used for recognition: (1) A ground-penetrating radar usually uses a "walk and inspect" working mode to form ground-penetrating radar data of a long survey line. However, in the ground-penetrating radar data, the reflection of a target body inside an underground structure shows an approximate hyperbolic property. A hyperbolic waveform reflected by the same target body is related to both ground-penetrating radar data of a spatial position corresponding to the target body and surrounding ground-penetrating radar data. After data is clipped and divided into short survey lines B-Scan, a reflected waveform of a target body, especially a target body at a clipping boundary position, is very likely to be truncated, resulting in that the reflected waveform of the target body in local short survey lines B-Scan is incomplete or is subject to interference. In this case, results of the short survey lines B-Scan are processed and spliced, leading to discontinuity of a target body recognition result of a continuous survey line, and it is difficult to process arbitrary length-continuous survey line ground-penetrating radar data. (2) In existing methods, permittivity inversion and disease recognition are separated, and the permittivity inversion and disease category recognition cannot be implemented simultaneously. In practice, based on the same set of ground-penetrating radar data, both concrete permittivity inversion and accurate disease recognition can be implemented and are particularly correlated. However, a correlation between the two tasks is not fully considered in the existing methods, and only a single inversion task or recognition task is implemented. As a result, the inversion task and the recognition task cannot be simultaneously implemented by fully exploiting a mutual promotion relationship between the two tasks. For example, Shandong University, in the patent document "Deep learning-based intelligent inversion method of a ground-penetrating radar" (Patent Application No.: 202010723091.7, Filing Date: Jan. 8, 2020, Application Publication No.: CN111781576A) proposes a deep learning-based intelligent inversion method of a ground-penetrating radar, which can reconstruct subsurface permittivity distribution end to end by using ground-penetrating radar data. However, the method is applicable to processing of short survey line ground-penetrating radar data of a fixed length, and continuous long survey line radar data inversion is prone to numerical discontinuity and shape dislocation of target body inversion of a continuous survey line. Moreover, the method is also used for implementing a single function of permittivity inversion based on ground-penetrating radar data, but does not simultaneously implement permittivity inversion and category recognition of a target body.

The inventor finds that the inspection technology for hidden defects in culverts and sluices mainly used at present mainly has the following problems: (1) Currently, the inspection of hidden defects in culverts and sluices is mainly based on manual inspection, and automatic inspection cannot be implemented. The inspection efficiency is low, and it is difficult to perform large-area and fine inspection of culverts and sluices. Therefore, it is difficult to accurately determine whether culverts and sluices are safe or not, and the inspection is time-consuming and laborious. (2) Currently, an ultrasonic probe used for ultrasonic inspection of concrete can only implement inspection at a fixed position. It is difficult to implement movable inspection, and the inspection efficiency is low. (3) Currently, corrosion of steel bars in culverts and sluices is mainly inspected by using a half-cell potential method. The method has a high environmental requirement and low inspection efficiency and can only complete sampling inspection, but it is difficult to complete all-around automatic inspection of corrosion of steel bars in culverts and sluices. (4) The inversion and recognition performed by using the foregoing methods lead to discontinuity in an imaging result of a target body of a continuous survey line or discontinuity in inversion values. It is difficult to process arbitrary length-continuous survey line ground-penetrating radar data. Moreover, in the existing method, permittivity inversion and disease recognition are separated, and permittivity inversion and disease category recognition cannot be implemented simultaneously.

SUMMARY

To solve the technical problems in the prior art, the present invention provides a wall-climbing robot system and a method for rapid nondestructive inspection of hidden defects in culverts and sluices. The method uses a robot to mount a radar and an ultrasonic probe and can perform all-around inspection of hidden defects in culverts and sluices.

A first aspect of the present invention provides a wall-climbing robot system for rapid nondestructive inspection of hidden defects in culverts and sluices.

A wall-climbing robot system for rapid nondestructive inspection of hidden defects in culverts and sluices includes:
  a vehicle body of a robot;
  a navigation positioning system and a moving system, both mounted on the vehicle body of the robot;
  an automatic knock inspection system, mounted at a front end of the vehicle body; a mobile ultrasonic rapid inspection system and a corrosion inspection system, both mounted at a bottom of the vehicle body;
  a dual-power system, formed by a non-contact negative pressure adsorption apparatus and rotor booster apparatuses, the non-contact negative pressure adsorption apparatus being mounted at the bottom of the vehicle body, the rotor booster apparatuses being mounted on two sides of the vehicle body; and
  a master controller, separately communicating with the navigation positioning system, the moving system, the automatic knock inspection system, the mobile ultrasonic rapid inspection system, the corrosion inspection system, and the dual-power system.

A second aspect of the present invention provides a working method of the wall-climbing robot system for rapid nondestructive inspection of hidden defects in culverts and sluices.

The working method of the wall-climbing robot system for rapid nondestructive inspection of hidden defects in culverts and sluices includes:
  starting the dual-power system, to cause the robot to be adsorbed to an inspected surface, the dual-power system monitoring the joint force of the robot in real time in an inspection process;
  completing, by the navigation positioning system, path planning, entering a rapid general survey mode, starting the automatic knock inspection system and the corrosion inspection system, making the moving system move at a high speed, and implementing rapid general survey of a defect region and rough recognition and positioning of defects by using the automatic knock inspection system, the corrosion inspection system, a multi-view panorama camera, and the navigation positioning system;
  reperforming path planning according to defect positioning information obtained through the rapid general survey mode, entering a fine inspection mode, making the moving system of the wall-climbing robot move to a defect position at a high speed, selectively starting the mobile ultrasonic rapid inspection system and the corrosion inspection system according to a category of a defect after the defect position is reached, simultaneously switching the moving system to move at a low speed, when the mobile ultrasonic rapid inspection system runs, making the master controller control a rotating telescopic apparatus according to information of a pressure sensor to maintain that ball type ultrasonic probes have the same and stable joint force, every time inspection of one defect is completed, making the wall-climbing robot move to another defect position at a high speed, making the wall-climbing robot move at a low speed in an inspection process, and after inspection of all defects is completed, making the wall-climbing robot return to an original point, to complete fine inspection of the defect region; and
  processing, by using a deep learning-based recognition method, data obtained based on ultrasound, recognizing positions and categories of internal defects by using a deformable convolution-based deep neural network for rotation region inspection, and continuously imaging internal diseases from a plurality sets of ultrasonic inspection data by using an "inversion-recognition" multi-task deep neural network fused with time sequence information.

Further, the working method of the wall-climbing robot system for rapid nondestructive inspection of hidden defects in culverts and sluices further includes simultaneous concrete permittivity inversion and disease recognition, a specific process being as follows:
  extracting an actual transmitted wavelet signal for a ground-penetrating radar device in a different application scenario, and performing forward modeling by using the wavelet signal as a source wavelet signal of simulation modeling, to generate a corresponding ground-penetrating radar profile, the ground-penetrating radar profile forming a data pair with an established permittivity distribution map and a target category label, to constitute a simulated training data set;
  constructing a ground-penetrating radar intelligent inversion and recognition model, and training the ground-penetrating radar intelligent inversion and recognition model based on the simulated training data set;

establishing a real training data set, and fine adjusting the ground-penetrating radar intelligent inversion and recognition model based on the real training data set and a transfer learning method; and performing permittivity inversion and disease recognition by using the fine adjusted ground-penetrating radar intelligent inversion and recognition model.

Compared with the prior art, the present invention has the following beneficial effects:

(1) The mobile ultrasonic rapid inspection system of the present invention implements mobile ultrasonic inspection by using the ball type ultrasonic probes. The ball type ultrasonic probes are joined to an inspected surface through an elastic apparatus in a mounting frame. A real-time joint force is monitored by a pressure sensor. Joint forces of the ultrasonic probes are kept stable by controlling the rotating telescopic apparatus, and consistency of measurement data is implemented. Moreover, in the ball type ultrasonic probes, the mobile ultrasonic inspection is implemented by combining a universal moving ball with the ultrasonic probes. The universal moving ball is coupled with the ultrasonic probes by a soft coupling block to implement the transmission of an ultrasonic wave, and a coupling force is increased by the elastic apparatus to reduce the loss of ultrasonic energy.

(2) The front automatic knock inspection system of the present invention implements automatic knock inspection by using an electromagnetic knocking apparatus. An automatic knocking controller controls the cooperation of two electromagnets to implement knocking at different frequencies and with different strengths. A sound receiver receives a sound signal to implement mobile automatic knocking through cooperation with moving wheels.

(3) The dual-power system of the present invention provides a main joint force of a robot through the non-contact negative pressure adsorption apparatus, provides auxiliary power through a rotor booster system, and is controlled by the master controller according to the joint force information fed back by a pressure sensor and a torque sensor. When atmospheric pressure provided by the non-contact negative pressure adsorption apparatus reaches an upper limit but still fails to meet a joint force requirement, the rotor booster apparatuses are started to implement power supplementation.

(4) The working method of the wall-climbing robot system for rapid nondestructive inspection of hidden defects in culverts and sluices of the present invention implements all-around inspection of culverts and sluices by dividing an inspection process into rapid general survey and fine inspection. A specific position of a hidden defect is determined through the rapid general survey. The fine inspection of a hidden defect is implemented according to the defect position obtained through rough inspection, so that all-around inspection of culverts and sluices can be implemented and the efficiency and quality of inspection can be ensured.

(5) The present invention innovatively provides a method for concrete permittivity inversion and disease recognition using arbitrary length-continuous survey line ground-penetrating radar data. Automatic inversion and recognition of ground-penetrating radar detection data of a continuous survey line of an arbitrary length are implemented by using a deep neural network model. The method uses a combination of a convolutional neural network and a recurrent neural network to perform context feature extraction and interaction, makes full use of the correlation among data of local short survey lines B-Scan at different positions of a continuous survey line to improve the consistency of disease characteristics at a splicing position, solves discontinuity problems of disease morphology and permittivity values at the splicing position, and is suitable for processing of arbitrary length-continuous survey line ground-penetrating radar data.

(6) The present invention fully exploits interdependence between inversion and recognition tasks of a ground-penetrating radar. Dielectric property inversion and accurate recognition of disease categories, positions, and shapes are simultaneously implemented by using only a network structure. Feature sharing of the inversion and recognition tasks of the ground-penetrating radar are implemented, and a generalization ability of the model is improved.

(7) The present invention obtains a data pair of "Ground-penetrating radar profile-Permittivity distribution map&Target category label" through simulation. A sufficient permittivity distribution map and target category label training data can be obtained by combining various background media and disease filling media. A Ricker wavelet with a frequency and a phase being consistent with a wavelet of the ground-penetrating radar is used as a source wavelet for modeling, and simulated data is preprocessed, to make simulated ground-penetrating radar detection data closer to real ground-penetrating radar detection data, to provide a guarantee for the generalization ability of a subsequent model on the real ground-penetrating radar detection data.

(8) The present invention further obtains the real ground-penetrating radar detection data of the continuous survey line of an arbitrary length, and uses a data enhancement technology to construct a real ground-penetrating radar data training data set. The transfer learning method is used. An intelligent inversion and recognition training network model trained based on simulated data is fine adjusted by using the real training data set, causing an intelligent inversion and recognition network model to learn real ground-penetrating radar detection data distribution, to more accurately recognize diseases in a real concrete structure.

(9) The method provided by the present invention can be used in the fields of nondestructive concrete inspection, road disease inspection, engineering geological survey, and the like, to implement fine dielectric property inversion of an internal structure and accurate recognition of disease categories, positions, and shapes inspected based on a continuous survey line of an arbitrary length.

Additional advantages of the present invention will be given in the following description, some of which will become apparent from the following description or may be learned from practices of the present invention.

BRIEF DESCRIPTION OF THE DRAWINGS

The accompanying drawings constituting a part of the present invention are used for providing a further understanding of the present invention. The schematic embodiments and description of the present invention are intended to explain the present invention, and do not constitute improper restriction to the present invention.

1. vehicle body, 2. moving wheel, 3. electromagnetic knocking apparatus, 301. knocking hammer, 302. housing of an automatic knocking apparatus, 303. mounting plate, 304. first electromagnet, 305. second electromagnet, 306. first elastic apparatus, 307. second elastic apparatus, 4. distance measuring encoder, 5. sound receiver, 6. middle moving wheel connecting rod, 7. driving motor, 8. rigid-flexible arc rod, 9. torque sensor, 10. rotor booster apparatus, 11. rotor motor, 12. rotor, 13. ground-penetrating radar, 14. ball type ultrasonic probe, 1401. universal ball, 1402. soft coupling block, 1403. ultrasonic probe, 1404. elastic apparatus, 1405. cylindrical housing, 1406. cover, 1407. ball, 15. movable ultrasonic probe mounting frame, 16. pressure sensor, 17. third elastic apparatus, 18. negative pressure adsorption motor, 19. negative pressure adsorption apparatus, 20. atmospheric pressure sensor, 21. multi-view panorama camera, 22. laser radar, and 23. rotating telescopic apparatus.

DETAILED DESCRIPTION

The present invention is further described below with reference to the accompanying drawings and embodiments.

It should be noted that the following detailed descriptions are all exemplary and are intended to provide a further understanding of the present invention. Unless otherwise specified, all technical and scientific terms used herein have the same meaning as commonly understood by a person of ordinary skill in the art to which the present invention belongs.

It should be noted, the terminology used herein is for the purpose of describing specific implementations only and is not intended to be limiting of exemplary implementations of the present invention. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Figure 1:
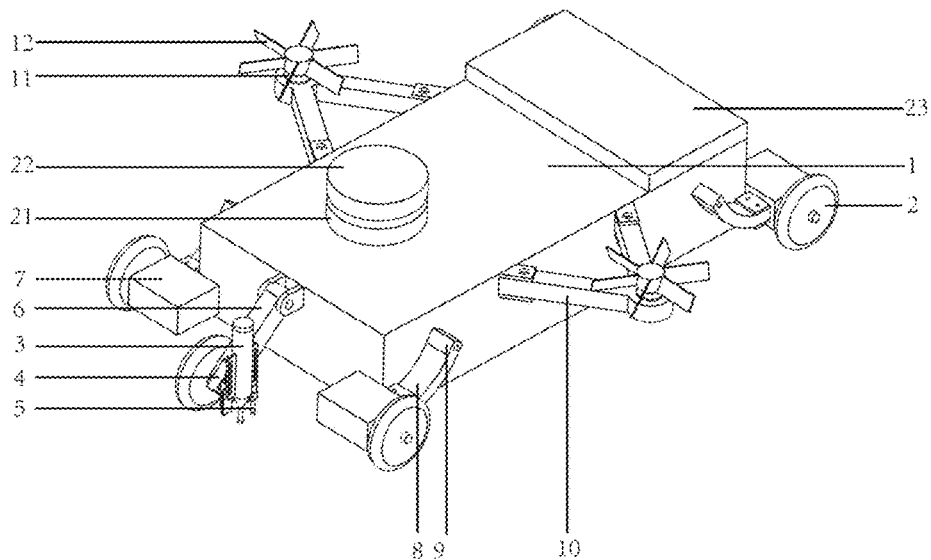
FIG. 1 is an overall block diagram of a wall-climbing robot system for rapid nondestructive inspection of hidden defects in culverts and sluices according to an embodiment of the present invention.
Figure 2:
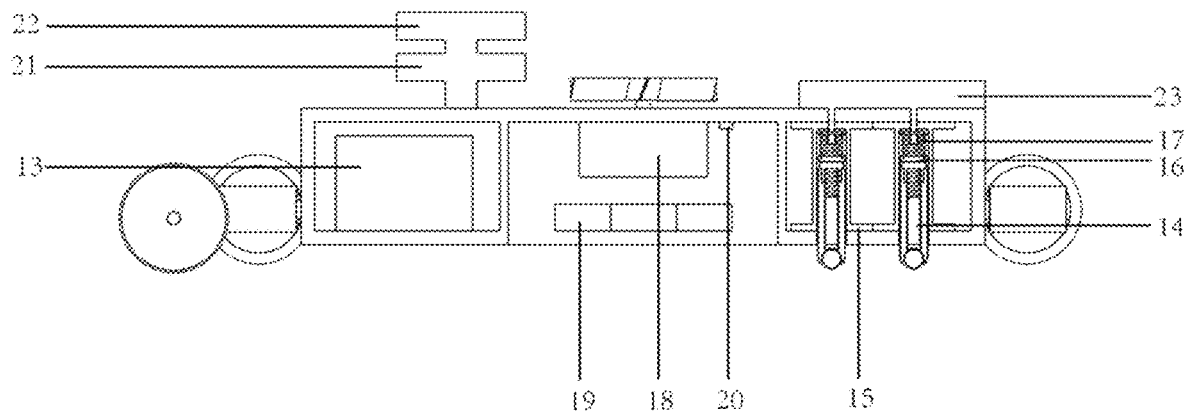
FIG. 2 is a cross-sectional view of a wall-climbing robot system for rapid nondestructive inspection of hidden defects in culverts and sluices according to an embodiment of the present invention.
Figure 3:
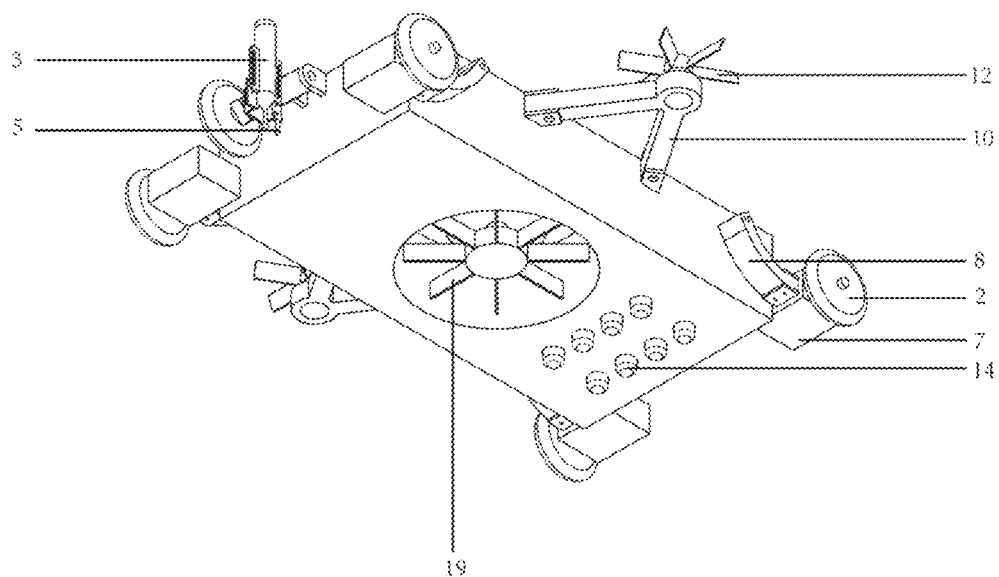
FIG. 3 is a bottom view of a wall-climbing robot system for rapid nondestructive inspection of hidden defects in culverts and sluices according to an embodiment of the present invention.

As shown in FIG. 1 to FIG. 3, a wall-climbing robot system for rapid nondestructive inspection of hidden defects in culverts and sluices in this embodiment includes: a vehicle body of a robot; a navigation positioning system and a moving system, both mounted on the vehicle body of the robot; an automatic knock inspection system, mounted at a front end of the vehicle body; a mobile ultrasonic rapid inspection system and a corrosion inspection system, both mounted at a bottom of the vehicle body; a dual-power system, formed by a non-contact negative pressure adsorption apparatus and rotor booster apparatuses, the non-contact negative pressure adsorption apparatus being mounted at the bottom of the vehicle body, the rotor booster apparatuses being mounted on two sides of the vehicle body; and a master controller, separately communicating with the navigation positioning system, the moving system, the automatic knock inspection system, the mobile ultrasonic rapid inspection system, the corrosion inspection system, and the dual-power system.

Figure 5:
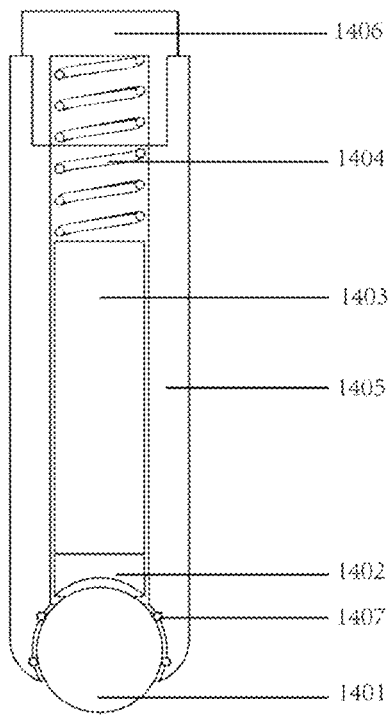
FIG. 5 is a schematic structural diagram of a movable ultrasonic probe according to an embodiment of the present invention.

As shown in FIG. 5, the mobile ultrasonic rapid inspection system uses a ball type ultrasonic probe array, to implement floating coupling and movable inspection of an ultrasonic contact. A universal ball 1401 is mounted in a spherical chamber at one end inside a cylindrical housing 1405 of the probe. The universal ball is made of a material with adequate sound transmission performance such as metal and ceramics. Balls 1407 are mounted on an inner wall of the spherical chamber and can improve rolling smoothness of the universal ball. A soft coupling block 1402 is connected to the universal ball and an ultrasonic probe. One end of the soft coupling block is bonded to a sound transmitting end (or receiving end) of an ultrasonic probe 1403, and the other end includes a spherical groove used to be joined to the universal ball. An ultrasound coupling liquid is added inside the cylindrical housing and is used to fill a gap between the soft coupling block and the universal ball. An other end of the ultrasonic probe is connected to an elastic apparatus 1404 and is used for auxiliary coupling. A cover 1406 is further disposed on an upper portion of the cylindrical housing of the probe.

It should be noted herein that the soft coupling block may be made of a material with a small acoustic attenuation coefficient, for example, polyester soft plastic, neoprene rubber, cast polyurethane rubber, or the like. A person skilled in the art may make a specific selection according to an actual case.

Specifically, a plurality of ball type ultrasonic probes 14 are mounted on a movable ultrasonic probe mounting frame 15 on a rear side inside the robot, to form an ultrasonic array. A pressure sensor 16 is connected to an upper portion of each ball type ultrasonic probe and is used to monitor a real-time joint force, and a third elastic apparatus 17 is connected to an other end of the pressure sensor and is used to provide a joint force. A rotating telescopic apparatus 23 is provided at an other end of the elastic apparatus and is used to adjust a joint force. The master controller controls the rotating telescopic apparatus 23 according to information of the pressure sensor to implement that the ball type ultrasonic probes 14 have the same and stable joint force. The transmission and reception of an ultrasonic signal of each ultrasonic probe is controlled by an ultrasonic inspection controller, and received information is inputted into the master controller for processing.

Figure 4:
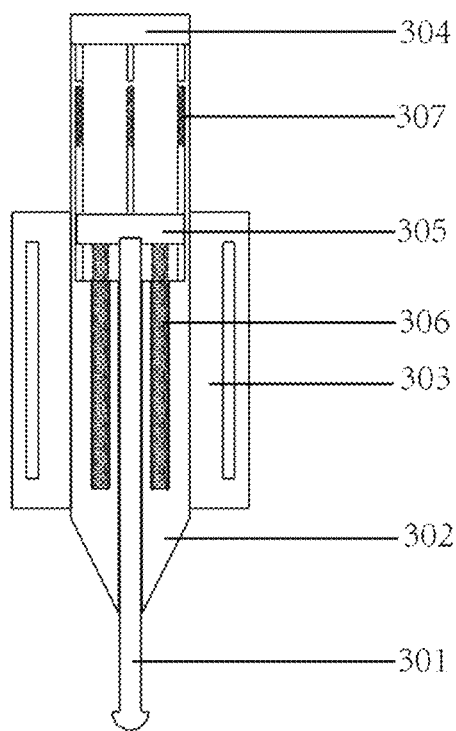
FIG. 4 is a schematic structural diagram of an automatic knocking apparatus according to an embodiment of the present invention.

As shown in FIG. 4, the automatic knock inspection system uses an electromagnetic knocking apparatus 3. The apparatus includes a knocking hammer 301 used for knocking. An other end of the knocking hammer is connected to a first electromagnet 304. The first electromagnet and the knocking hammer are mounted inside a housing of the knocking apparatus. A second electromagnet 305 is fixed on an upper portion of the housing 302 of the knocking apparatus, and the two electromagnets are controlled by an automatic knocking controller and cooperate with a first elastic apparatus 306 and a second elastic apparatus 307 inside the housing of the knocking apparatus to implement automatic knocking. The electromagnetic knocking apparatus and a distance measuring encoder 4 are mounted on a middle moving wheel at a front portion of the robot. The distance measuring encoder 4 is used for positioning. A sound receiver 5 is mounted at a position close to the ground on a rear side of an automatic knocking apparatus. The automatic knock inspection system completes rapid inspection of a defect region. A mounting plate 303 is provided at the housing 302 of the knocking apparatus.

In a specific implementation, the corrosion inspection system observes a corrosion status of steel bars in concrete by using a ground-penetrating radar-based two-step staggered detection mode. A ground-penetrating radar 13 is mounted on a rear side of the bottom of the vehicle body of the robot. The first step is rough detection, including: obtaining a radar survey line profile (B-Scan) through walking in any direction, and determining an arrangement direction of the steel bars by using a deep neural network-based rapid positioning algorithm for steel bars; and the second step is corrosion diagnosis, including: performing scanning in the arrangement direction of the steel bars, and determining a corrosion degree and a corrosion position of a current position by using a change in a feature parameter such as an amplitude of a time domain signal (A-Scan) at a different position.

In this embodiment, the dual-power system includes a non-contact negative pressure adsorption apparatus 19 and rotor booster apparatuses 10. The non-contact negative pressure adsorption apparatus is mounted in a middle part inside the vehicle body of the robot and is provided with an atmospheric pressure sensor 20. The rotor booster apparatuses are mounted on two sides of the vehicle body of the robot. A torque sensor 9 is mounted at one end of a rigid-flexible arc rod 8 of the moving system connected to the vehicle body and is used to monitor a real-time joint force. The negative pressure adsorption apparatus and the rotor booster apparatuses are connected to the master controller. The master controller controls, according to information of the torque sensor 9 and the atmospheric pressure sensor 20, whether to start the rotor booster apparatuses. When atmospheric pressure provided by the non-contact negative pressure adsorption apparatus reaches an upper limit but still fails to meet a joint force requirement, the rotor booster apparatuses are started to implement power supplementation. Each rotor booster apparatus 10 includes a rotor motor 11 and a rotor 12. The rotor motor 11 is used to drive the rotor 12 to rotate. The non-contact negative pressure adsorption apparatus is powered by a negative pressure adsorption motor 18.

Specifically, the moving system includes a rigid-flexible arc rod, wheels, a driving motor, and a torque sensor. The rigid-flexible arc rod 8 is used to connect the vehicle body 1 of the robot and the wheels and is used for shock absorption and transmission of a joint force. The driving motor 7 is connected to moving wheels 2 to implement movement and steering of the robot. The torque sensor 9 is mounted at one end of the rigid-flexible arc rod connected to the vehicle body and is used to monitor a real-time joint force of the robot. A middle moving wheel connecting rod 6 is connected between two moving wheels 2 at the front portion of the robot.

In this embodiment, the navigation positioning system includes a multi-view panorama camera 21 and a laser radar 22. The multi-view panorama camera is used for detecting surface diseases of culverts and sluices. The laser radar is used for implementing automatic composition of detection regions of culverts and sluices.

A working principle of the wall-climbing robot system for rapid nondestructive inspection of hidden defects in culverts and sluices in this embodiment is to use an inspection mode of "rapid general survey→fine inspection", and specific steps are as follows:

Step (1): Start the dual-power system of the robot, to cause the robot to be adsorbed to an inspected surface, the dual-power system monitoring the joint force of the robot in real time in an inspection process. When a joint force provided by the non-contact negative pressure adsorption apparatus 19 meets a requirement, it is not necessary to start the rotor booster apparatuses 10, or otherwise, the rotor booster apparatuses need to be started to implement joint force supplementation.

Step (2): The navigation positioning system completes path planning, enters a rapid general survey mode, starts the automatic knock inspection system and the corrosion inspection system, makes the moving system move at a high speed, implements rapid general survey of a defect region by making the electromagnetic knocking apparatus 3 knock the inspected surface with a fixed frequency, the sound receiver 5 receive a sound signal, the radar transmit and receive an electromagnetic wave, and the micro multi-view panorama camera 21 shoot a surface of inspection regions, and completes rough recognition and positioning of defects by making the master controller process received information.

Step (3): Reperform path planning according to defect positioning information obtained through the rapid general survey mode, enter a fine inspection mode, make the moving system of the wall-climbing robot move to a defect position at a high speed, selectively start the mobile ultrasonic rapid inspection system and the corrosion inspection system according to a category of a defect after the defect position is reached, simultaneously switch the moving system to move at a low speed, when the mobile ultrasonic rapid inspection system runs, make the master controller control the rotating telescopic apparatus 23 according to information of the pressure sensor 16 to maintain that the ball type ultrasonic probes have the same and stable joint force, every time inspection of one defect is completed, make the wall-climbing robot move to another defect position at a high speed, make the wall-climbing robot move at a low speed in an inspection process, and after inspection of all defects is completed, make the wall-climbing robot return to an original point, to complete fine inspection of the defect region; and process, by using a deep learning-based recognition method, data obtained based on ultrasound, recognize positions and categories of internal defects by using a deformable convolution-based deep neural network for rotation region inspection, and continuously image internal diseases from a plurality sets of ultrasonic inspection data by using an "inversion-recognition" multi-task deep neural network fused with time sequence information.

Different concrete structures have complex and diverse defect morphology. However, due to the influence of diffraction, reflection, scattering, or the like, a defect response in an ultrasonic image and an actual shape of a concrete defect usually do not have a one-to-one correspondence. To accurately recognize the response and in-phase axis morphology of the concrete defect from the ultrasonic image, this embodiment constructs a deformable convolution-based method for intelligently recognizing a concrete defect response and position, and introduces deformable convolution that can arbitrarily change the shape according to the defect morphology to replace conventional regular shape convolution. The in-phase axis morphology of different defects is adaptively extracted, so that defects distributed in any direction are found and located.

According to the characteristic of mobile measurement, an "inversion-recognition" multi-task deep neural network fused with time sequence information is designed to solve a continuous imaging problem of an internal concrete defect under a long survey line. Different from a conventional encoding-decoding network based only on convolution, the method designs a spatial-temporal feature extraction module to fuse spatial-temporal information of measurement data at different moments. First, test data at a plurality of moments are inputted into an encoding-decoding network in parallel. Then, the decoded features are inputted in parallel into a ConvLSTM-based spatial-temporal feature extraction module, and a correlation between the ultrasound data at two consecutive moments is mined, and high-dimensional feature information covering a wave speed and an interface in measurement results at the former moment is memorized and fused. The continuous defect interface and morphology are accurately reconstructed. On this basis, a multi-task branch is designed for output, and categories and wave speed distribution of defects are outputted simultaneously, thereby implementing the integration of defect recognition and wave speed inversion.

Figure 6:
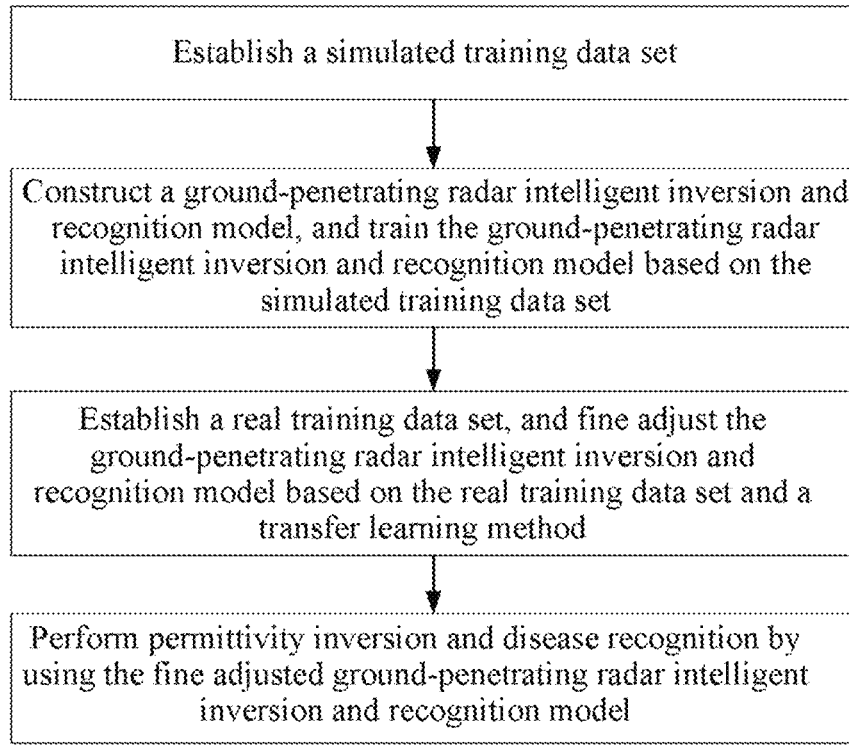
FIG. 6 is a flowchart of a method for concrete permittivity inversion and disease recognition using arbitrary length-continuous survey line ground-penetrating radar data according to Embodiment 1.

In another embodiment, a working method of the wall-climbing robot system for rapid nondestructive inspection of hidden defects in culverts and sluices further includes simultaneous concrete permittivity inversion and disease recognition. As shown in FIG. 6, a specific process is as follows:

Step S1: Establish a simulated training data set.

A corresponding simulated data set is established for the problem of structural inspection of diseases in tunnel linings. Step S1 specifically includes the following steps.

Step S101: Construct a permittivity distribution map and a target category label for tunnel lining structures of various lengths.

Specifically, for a random combination of a background medium, a disease internal medium, a disease quantity, and a disease position, a permittivity distribution map of a profile of a lining structure is generated according to each combination manner. For the permittivity distribution map of each profile, a pair of target category labels corresponding to the permittivity distribution map of the profile is generated according to each target body category included in the distribution map.

A tunnel lining structure model includes lining models with lengths of 5 m, 10 m, 15 m, and the like, to simulate a plurality of continuous survey line lengths that are in line with reality.

The background medium includes various background media such as plain concrete and reinforced concrete. The diseases include voids, incompactness, cracks, cavities, faults, solutional caves, and the like. The disease internal medium is a medium such as water, air, mud, and rock.

According to targets in a permittivity model, the target body category further includes: steel bars, a background, dry voids, dry incompactness, dry cracks, dry cavities, dry faults, dry solutional caves, water-bearing voids, water-bearing incompactness, water-bearing cracks, water-bearing cavities, water-bearing faults, water-bearing solutional caves, and the like, to better recognize the target body category in the tunnel lining.

Step S102: Perform forward modeling on each permittivity distribution map by using a Ricker wavelet with a frequency and a phase being consistent with the wavelet of a ground-penetrating radar as a source wavelet for modeling, to generate a corresponding ground-penetrating radar profile, and perform preprocessing on the profile by using a method such as direct wave removal, gain adjustment, and noise addition to improve adaptability of real data.

The forward modeling uses an FDTD method.

The direct wave removal is to subtract data of a channel in which a waveform without diseases is located from obtained simulated ground-penetrating radar data. The gain adjustment is to adjust a gain of simulated data by comparing an amplitude level of the Ricker wavelet used for generating the simulated ground-penetrating radar data and the level of an air-mining direct wave acquired by a ground-penetrating radar device from air, to enable the simulated data to be in the same dimension. The noise addition is to acquire ground-penetrating radar data of background media at different sites, and randomly select different ratios from 0 to 1 to add the data to the simulated ground-penetrating radar data.

Figure 10:
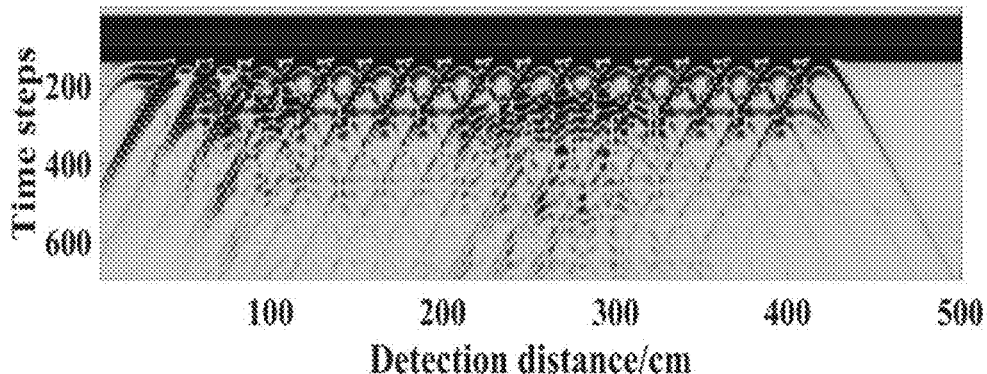
FIG. 10 shows simulated ground-penetrating radar detection data according to an embodiment.
Figure 11:
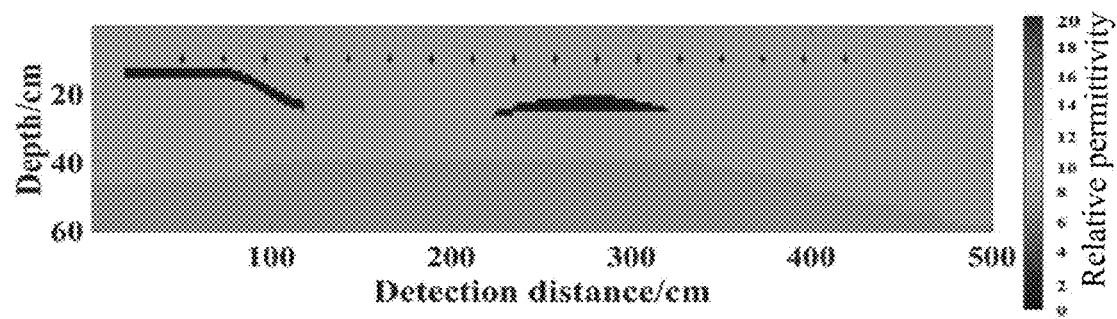
FIG. 11 is a simulated permittivity distribution map according to an embodiment.
Figure 12:
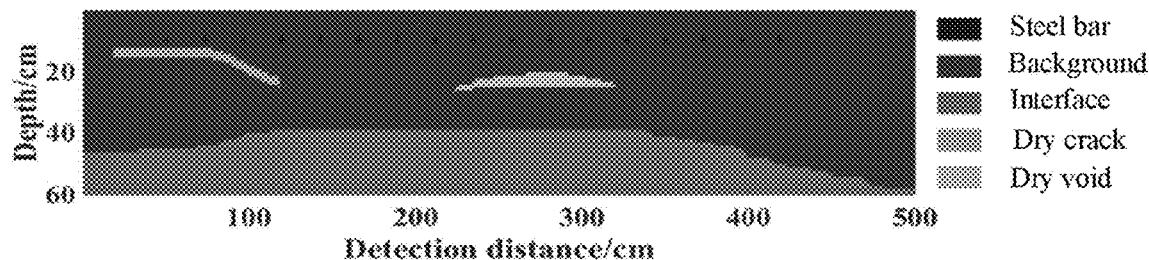
FIG. 12 shows a simulated target category label according to an embodiment.

Step S103: Obtain a plurality of data pairs of "Ground-penetrating radar profile-Permittivity distribution map&Target category label" by using the obtained corresponding processed ground-penetrating radar profile (as shown in FIG. 10), corresponding permittivity distribution map (as shown in FIG. 11), and the target category label (as shown in FIG. 12). The permittivity distribution map and the target category label in each data pair are used as labels of the ground-penetrating radar profile, to establish a simulated training data set.

Step S2: Construct and train an arbitrary length-continuous survey line ground-penetrating radar intelligent inversion and recognition network model.

Step S2 specifically includes the following steps.

Step S201: Construct an arbitrary length-continuous survey line ground-penetrating radar intelligent inversion and recognition network structure.

Figure 7:
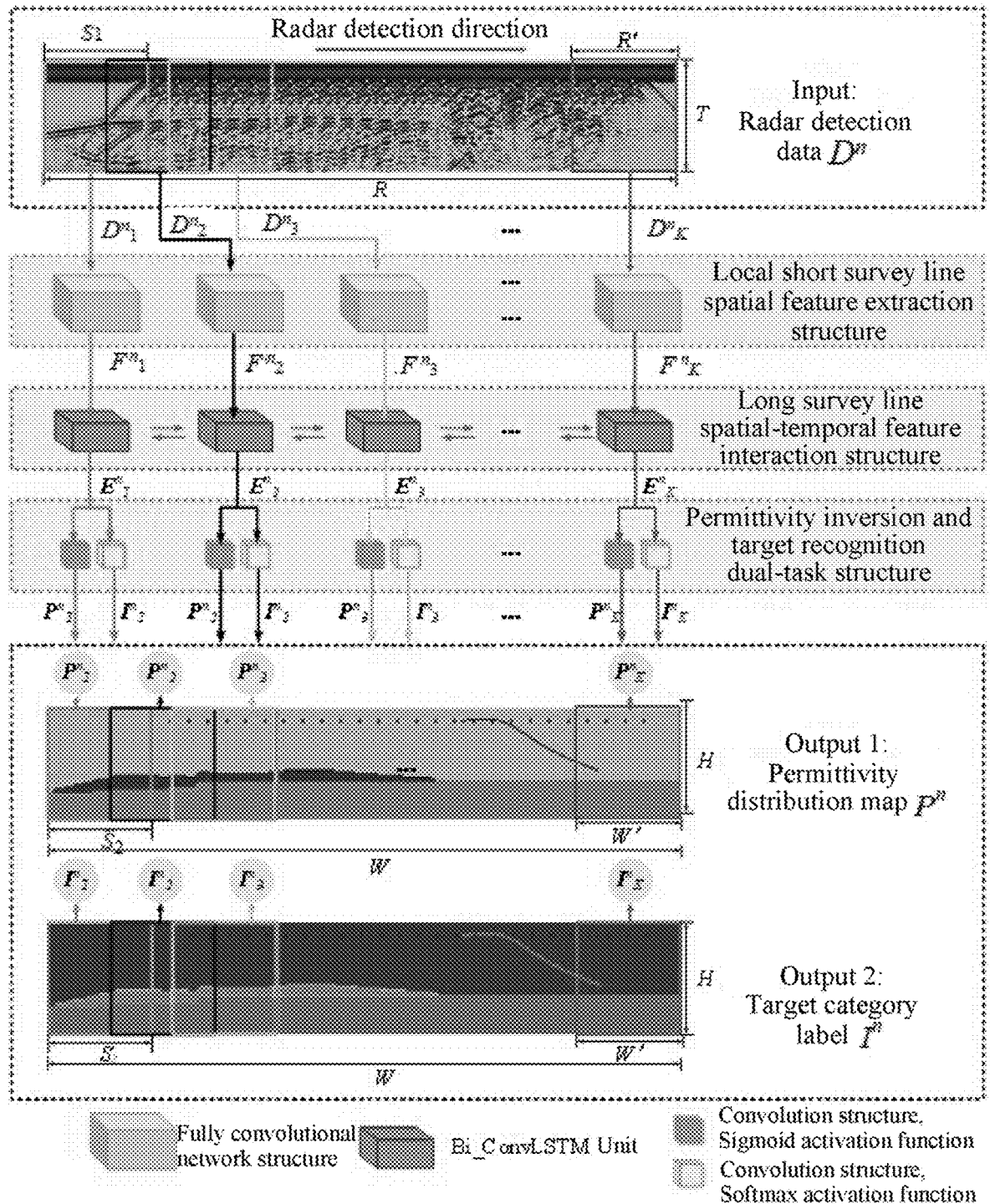
FIG. 7 is a schematic diagram of an arbitrary length-continuous survey line ground-penetrating radar intelligent inversion and recognition network structure according to Embodiment 1.

The arbitrary length-continuous survey line ground-penetrating radar intelligent inversion and recognition network structure uses a cascaded implementation of "local short survey line spatial feature extraction structure→long survey line spatial-temporal feature interaction structure→permittivity inversion and target recognition dual-task structure. As shown in FIG. 7, the arbitrary length-continuous survey line ground-penetrating radar intelligent inversion and recognition network structure uses arbitrary length-continuous survey line ground-penetrating radar detection data $D^n$ ($n \in [1, N]$, N is a quantity of all continuous survey line ground-penetrating radar detection data in the data set) as an input. First, by using a sliding window with a step size of $S_1$, $D^n$ is sequentially cut to obtain a local short survey line B-Scan profile sequence $\{D_k^n | k=1, \ldots, K\}$ (K is a quantity of local short survey line B-Scan profiles with a fixed size after $D^n$ is cut). Then, the local short survey line spatial feature extraction structure performs spatial context feature extraction on each local short survey line B-Scan profile $D_k^n$ in parallel, to obtain a feature sequence $\{(F_k^n | k=1, \ldots, K\}$. Then, the long survey line spatial-temporal feature interaction structure uses $\{F_k^n | k=1, \ldots, K\}$ as an input, and through bidirectional spatial-temporal information fusion in the feature sequence, an enhanced feature sequence $\{E_k^n | k=1, \ldots, K\}$ including relatively stable target features (including a shape, a category, and a permittivity) is extracted. Next, the permittivity inversion and target recognition dual-task structure processes the enhanced feature $E_k^n$ of each local short survey line B-Scan profile $D_k^n$ in parallel, reconstructs a corresponding a permittivity distribution map $P_k^n$, and recognizes a target category label $I_k^n$. Finally, by using a sliding window with a step size of $S_2$, $\{P_k^n | k=1, \ldots, K\}$ and $\{I_k^n | k=1, \ldots, K\}$ are spliced together sequentially, and an overlapping position is averaged, to obtain a permittivity map $P^n$ and the target category label $I^n$ of an entire continuous survey line.

Specifically, three structures are as follows:

(1) The local short survey line spatial feature extraction structure is implemented by using a plurality of parallel fully convolutional network structures. Each fully convolutional network structure is used for separately processing local short survey line B-Scan profiles $D_k^n$ extracted from different positions in a continuous survey line of an arbitrary length, and spatial context feature extraction is performed on the profile, to form a feature sequence $\{F_k^n | k=1, \ldots, K\}$ of arbitrary length-continuous survey line ground-penetrating radar detection data.

Figure 8:
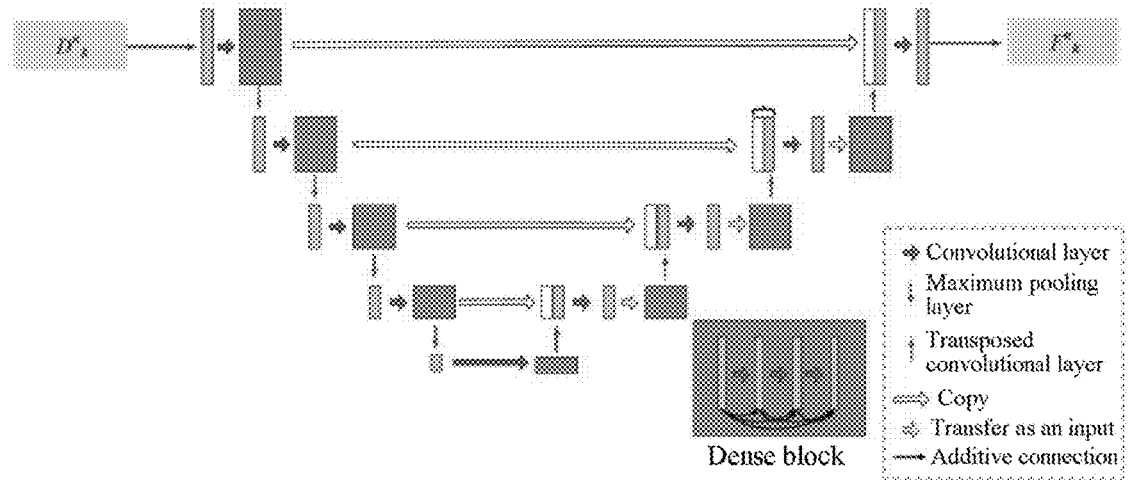
FIG. 8 is a schematic diagram of a local short survey line spatial feature extraction structure based on DenseUnet according to Embodiment 1.

In an implementation, the fully convolutional network structure is implemented by using a DenseUnet network. As shown in FIG. 8, the DenseUnet structure is formed by one encoding path and one decoding path. The encoding path includes four convolutional layers, four maximum pooling layers, and four dense block structures. The decoding path includes four convolutional layers, four transposed convolutional layers, and four dense block structures. The encoding path is connected to the decoding path by one convolutional layer. The encoding path compresses the ground-penetrating radar detection data into a high-level abstract feature through stepwise downsampling. The decoding path obtains a preliminary representation of an internal spatial structure of the tunnel lining through a stepwise upsampling operation. The convolutional layer structure has a convolution kernel size of 3*3, a step size of 1, and a channel quantity of 64, to extract spatial features in the ground-penetrating radar detection data. Each dense block of the encoding path is connected to a maximum pooling layer. The maximum pooling layer has a kernel size of 2*2 and a step size of 2. A downsampled output is transmitted to a next dense block of the encoding path. Each transposed convolutional layer of the decoding path is connected to the dense block. The transposed convolutional layer has a filter size of 4*4, a step size of 2, and a channel quantity of 64. Channel dimension splicing is performed on an upsampled output and a dense block from a corresponding encoding path, and is then delivered into a next dense block of the decoding path. The dense block structure includes three convolutional layer structures connected in series. The convolutional layer has a convolution kernel size of 3*3, a step size of 1, and a channel quantity of 64. Each convolutional layer adds outputted information of all previous convolutional layers to an output of the convolutional layer to promote a gradient flow and better learn the representation of the ground-penetrating radar data. In addition, corresponding dense block structures in the encoding path and the decoding path are connected by a skip layer, so that spatial information in an encoding process may be transferred to a decoding process of an internal structure of the tunnel lining.

The local short survey line spatial feature extraction structure performs spatial context feature extraction on data of the local short survey line B-Scan profiles extracted from different positions in a continuous survey line of an arbitrary length, to form preliminary mapping of ground-penetrating radar profile data to spatial information of internal structure of concrete.

(2) The long survey line spatial-temporal feature interaction structure is implemented by using a one-layer Bi-ConvLSTM structure. The Bi-ConvLSTM structure implements bidirectional spatial-temporal information fusion in a local short survey line B-Scan profile feature sequence $\{F_k^n | k=1, \ldots, K\}$. Through forward (which is a forward direction of a ground-penetrating radar detection direction) and backward (which is a reverse direction of the ground-penetrating radar detection direction) adaptive information fusion of a local short survey line B-Scan feature, Bi-ConvLSTM generates an enhanced feature sequence $\{E_k^n | k=1, \ldots, K\}$ including spatial context information between the local short survey line B-Scan profiles, to perform inversion or recognition of a tunnel lining internal target having a continuous shape, a category, and a permittivity value.

Figure 9:
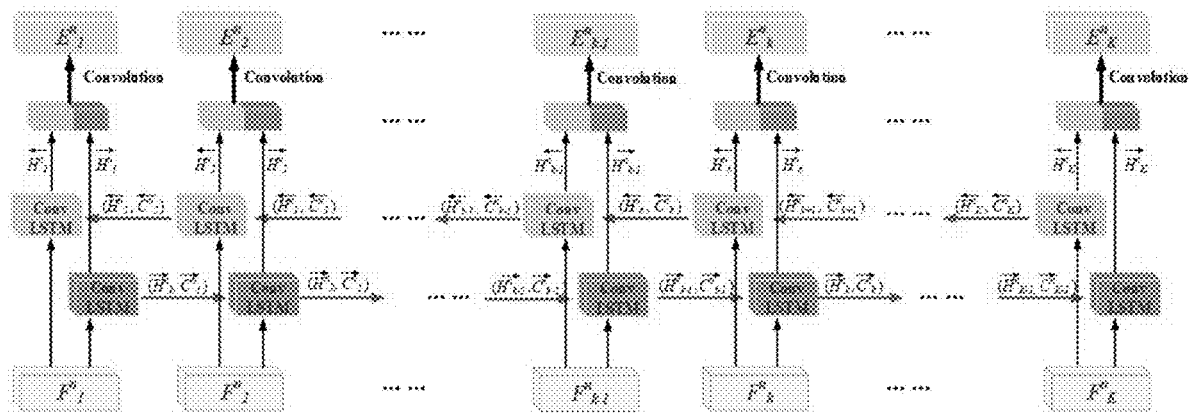
FIG. 9 is a schematic diagram of a long survey line spatial-temporal feature interaction structure according to an embodiment.

In an implementation, as shown in FIG. 9, the long survey line spatial-temporal feature interaction structure includes a one-layer Bi-ConvLSTM structure. The Bi-ConvLSTM includes one forward ConvLSTM layer, one reverse ConvLSTM layer, and one convolutional layer. The Bi-ConvLSTM uses a ground-penetrating radar data feature sequence $\{F_k^n | k=1, \ldots, K\}$ extracted by the local short survey line spatial feature extraction structure as an input. The forward ConvLSTM layer transfers forward a hidden state $\overrightarrow{H_k^n}$ and a memory cell $\overrightarrow{C_k^n}$ between local short survey line B-Scan profiles in a ground-penetrating radar detection direction. The backward ConvLSTM layer transfers backward the hidden state $\overleftarrow{H_k^n}$ and the memory cell $\overleftarrow{C_k^m}$ between the local short survey line B-Scan profiles in a reverse direction of the ground-penetrating radar detection direction. For each inputted local short survey line profile feature $F_k^n$, a Bi-ConvL- STM unit connects a corresponding forward hidden state $\overrightarrow{H_k^n}$ and backward hidden state $\overline{H_k^n}$ in channel dimension, and then obtains a final enhanced feature including the spatial context information between the local short survey line B-Scan profiles through one convolutional layer. A ConvLSTM internal convolution structure and a convolutional layer convolution structure both use a convolution kernel size of 3*3, a step size of 1, and a channel quantity of 64.

The long survey line spatial-temporal feature interaction structure fuses bidirectional spatial-temporal information between data features of the local short survey lines B-Scan at different positions extracted from a continuous survey line of an arbitrary length, to ensure the continuity and accuracy of a result of permittivity inversion of a tunnel lining structure of the continuous survey line and a recognition result of a target body.

(3) The permittivity inversion and target recognition dual-task structure is implemented by using a plurality of parallel two-branch convolutional network structures. Each parallel two-branch convolutional network structure separately processes the enhanced feature $E_k^n$ of each local short survey line B-Scan profile $D_k^n$ extracted by the long survey line spatial-temporal feature interaction structure, and simultaneously reconstructs of the permittivity distribution of a tunnel lining structure and recognizes disease categories, positions, and contours.

In an implementation, the two-branch convolutional network structure includes an inversion task branch and a recognition task branch, and each branch includes one convolutional layer and one activation function. The inversion task branch first uses one convolutional layer to reduce an inputted feature dimension to a convolution kernel size of 1*1, a step size of 1, and a channel quantity of 1. The recognition task branch first uses one convolutional layer to reduce the inputted feature dimension to a convolution kernel size of 1*1, a step size of 1, and a channel quantity of 9. Finally, a sigmoid activation function is connected to a tail portion of the inversion branch to regress the permittivity distribution map, and the recognition branch is connected to a softmax function to classify a target category.

The permittivity inversion and target recognition dual-task structure simultaneously reconstructs the permittivity distribution of a concrete structure and recognizes disease categories, positions, and contours, to implement feature sharing between an inversion task and a recognition task of the ground-penetrating radar and enhance a generalization ability of the model.

Step S202: Train the arbitrary length-continuous survey line ground-penetrating radar intelligent inversion and recognition network model based on the simulated training data set.

Based on the simulated training data set, the arbitrary length-continuous survey line ground-penetrating radar intelligent inversion and recognition network model is optimized by using a loss function in combination with a mean square error (MAE), a structural similarity index (SSIM), and Lovasz_Softmax, and an ADAM optimization algorithm, to perform training to obtain the arbitrary length-continuous survey line ground-penetrating radar intelligent inversion and recognition network model.

Step S3: Establish a real training data set, and use a transfer learning method to obtain the arbitrary length-continuous survey line ground-penetrating radar intelligent inversion and recognition network model that is applicable to actual the ground-penetrating radar detection data.

Step S3 specifically includes the following steps.

Step S301: Establish a real training data set.

Corresponding random clipping and bilinear interpolation in a horizontal direction are performed on continuous survey line ground-penetrating radar profile data actually inspected by a ground-penetrating radar, a permittivity model established according to an actual site, and a target category label to enhance data, to establish the real training data set.

Step S302: Obtain, based on the real training data set and by using the transfer learning method, the arbitrary length-continuous survey line ground-penetrating radar intelligent inversion and recognition network model that is applicable to actual the ground-penetrating radar detection data.

An intelligent inversion and recognition training network model trained based on simulated data is fine adjusted by using the real training data set, causing the arbitrary length-continuous survey line ground-penetrating radar intelligent inversion and recognition network model to learn real ground-penetrating radar detection data distribution, to more accurately recognize diseases of the real lining structure.

Step S4: Perform permittivity inversion and disease recognition on the actually acquired continuous survey line ground-penetrating radar detection data by using the arbitrary length-continuous survey line ground-penetrating radar intelligent inversion and recognition network model, to obtain a corresponding permittivity distribution map and target category label.

Figure 13:
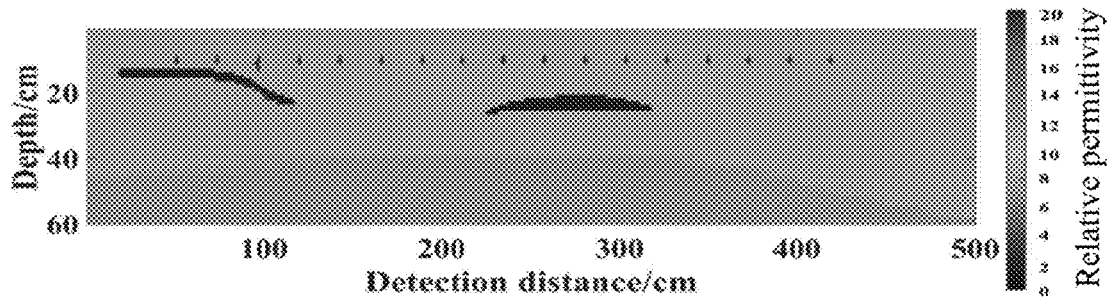
FIG. 13 is a permittivity distribution map predicted by an arbitrary length-continuous survey line ground-penetrating radar intelligent inversion and recognition network according to an embodiment.
Figure 14:
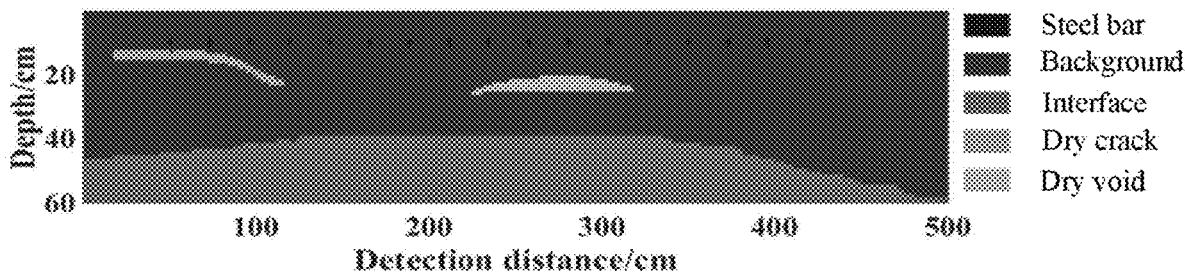
FIG. 14 is a target category label predicted by an arbitrary length-continuous survey line ground-penetrating radar intelligent inversion and recognition network according to an embodiment.

A trained intelligent inversion and recognition model parameter that is applicable to actual data is substituted into a constructed intelligent inversion and recognition network, and then a prediction model that may be practically applied may be obtained. Then, a graphical interface is developed by using a Pyqt interface development tool to generate an interface for use by a user. The user may arbitrarily select the acquired continuous survey line ground-penetrating radar detection data and input the data into the graphical interface. Next, the prediction model performs inversion and recognition on the ground-penetrating radar detection data, to generate the permittivity distribution map and a target category. As shown in FIG. 13 and FIG. 14, a storage position of the generated permittivity distribution map and the target category label may be selected by the user.

According to the permittivity distribution map and the target category label, a background medium, disease morphology, filling media in diseases, and disease categories of the lining structure inspected in a continuous survey line may be restored, thereby implementing disease inspection.

Certainly, in the foregoing embodiments, it is readily apparent to a person skilled in the art that the design of parameters, the architecture of the network, and the like may be changed according to specific working conditions and scenarios, and shall fall within the protection scope of the present invention. Details are not described herein again.

The foregoing descriptions are exemplary embodiments of the present disclosure but are not intended to limit the present disclosure. The present disclosure may include various modifications and changes for a person skilled in the art. Any modification, equivalent replacement, or improvement made without departing from the spirit and principle of the present disclosure shall fall within the protection scope of the present disclosure.

What is claimed is:

1. A wall-climbing robot system for rapid nondestructive inspection of hidden defects in culverts and sluices, comprising:

a vehicle body of a robot;

a navigation positioning system and a moving system, both mounted on the vehicle body of the robot;

an automatic knock inspection system, mounted at a front end of the vehicle body;

a mobile ultrasonic rapid inspection system and a corrosion inspection system, both mounted at a bottom of the vehicle body;

a dual-power system, formed by a non-contact negative pressure adsorption apparatus and rotor booster apparatuses, the non-contact negative pressure adsorption apparatus being mounted at the bottom of the vehicle body, the rotor booster apparatuses being mounted on two sides of the vehicle body; and a master controller, separately communicating with the navigation positioning system, the moving system, the automatic knock inspection system, the mobile ultrasonic rapid inspection system, the corrosion inspection system, and the dual-power system.

2. The wall-climbing robot system for rapid nondestructive inspection of hidden defects in culverts and sluices according to claim 1, wherein the navigation positioning system comprises a multi-view panorama camera and a laser radar, the multi-view panorama camera is used to inspect a surface defect of culverts and sluices, and the laser radar is used to implement automatic composition of inspection regions of culverts and sluices.

3. The wall-climbing robot system for rapid nondestructive inspection of hidden defects in culverts and sluices according to claim 1, wherein the moving system comprises an arc rod, wheels, a driving motor, and a torque sensor;

the arc rod is used to connect the vehicle body of the robot and the wheels and is used for shock absorption and transmission of a joint force of the robot;

the driving motor is connected to the wheels to implement movement and steering of the robot; and the torque sensor is connected to an end of the vehicle body of the robot and is used to monitor in real-time the joint force of the robot.

4. The wall-climbing robot system for rapid nondestructive inspection of hidden defects in culverts and sluices according to claim 3, wherein the non-contact negative pressure adsorption apparatus is provided with an atmospheric pressure sensor, the master controller is used to control, according to information of the torque sensor and the atmospheric pressure sensor, whether to start the rotor booster apparatuses, and when atmospheric pressure provided by the non-contact negative pressure adsorption apparatus reaches an upper limit but still fails to meet a joint force requirement, the rotor booster apparatuses are started to implement power supplementation.

5. The wall-climbing robot system for rapid nondestructive inspection of hidden defects in culverts and sluices according to claim 1, wherein the automatic knock inspection system is an electromagnetic knocking apparatus, the electromagnetic knocking apparatus comprises a knocking hammer for knocking, an end of the knocking hammer is connected to a first electromagnet, the first electromagnet and the knocking hammer are mounted inside a housing of the knocking apparatus, a second electromagnet is fixed on an upper portion of the housing of the knocking apparatus, and the first and the second electromagnets are controlled by an automatic knocking controller and cooperate with an elastic apparatus inside the housing of the knocking apparatus to implement automatic knocking.

6. The wall-climbing robot system for rapid nondestructive inspection of hidden defects in culverts and sluices according to claim 5, wherein the automatic knock inspection system further comprises a sound receiver, the sound receiver is mounted at a position close to the ground on a rear side of the electromagnetic knocking apparatus, the sound receiver is connected to the automatic knocking controller, and the automatic knocking controller is connected to the master controller.

7. The wall-climbing robot system for rapid nondestructive inspection of hidden defects in culverts and sluices according to claim 1, wherein the mobile ultrasonic rapid inspection system includes a ball type ultrasonic probe array of ball type ultrasonic probes, each ball type ultrasonic probe comprising the probe and the universal ball, the universal ball being arranged in a spherical chamber, the spherical chamber being arranged inside a cylindrical housing of the probe, the universal ball being connected to the ultrasonic probe by a soft coupling block, one end of the soft coupling block being bonded to a sound transmitting or receiving end of the ultrasonic probe, the other end of the soft coupling block comprising a spherical groove used to be joined to the universal ball, an ultrasound coupling liquid being arranged inside the cylindrical housing and filling a gap between the soft coupling block and the universal ball, and an end other than the sound transmitting or receiving end of the ultrasonic probe being connected to an elastic apparatus and is used for auxiliary coupling.

8. The wall-climbing robot system for rapid nondestructive inspection of hidden defects in culverts and sluices according to claim 7, wherein a pressure sensor is connected to an upper portion of each ball type ultrasonic probe and is used to monitor in real-time a joint force of the robot, the elastic apparatus being connected to another end of the pressure sensor and being used to provide the joint force, a rotating telescopic apparatus being provided at an another end of the elastic apparatus and being used to adjust the joint force;

the master controller is used to adjust the rotating telescopic apparatus according to information of the pressure sensor such that the ball type ultrasonic probes have the joint force that is the same and stable; and each ultrasonic probe is connected to an ultrasonic inspection controller, the ultrasonic inspection controller being connected to the master controller.

9. A working method of the wall-climbing robot system for rapid nondestructive inspection of hidden defects in culverts and sluices according to claim 8, comprising:

starting the dual-power system, to cause the robot to be adsorbed to an inspected surface, the dual-power system monitoring the joint force of the robot in real time in an inspection process;

completing, by the navigation positioning system, a first path planning, entering a rapid general survey mode, starting the automatic knock inspection system and the corrosion inspection system, moving, by the moving system, the robot along the planned path at a first speed, and implementing a rapid general survey of a defect region and rough recognition and positioning of defects by using the automatic knock inspection system, the corrosion inspection system, the multi-view panorama camera, and the navigation positioning system;

performing a second path planning according to defect positioning information obtained through the rapid general survey mode, entering a fine inspection mode to perform a fine inspection for the defects, moving, by the moving system, the robot at the first speed to a defect position, selectively starting the mobile ultrasonic rapid inspection system and the corrosion inspection system according to a category of the defect after the defect position is reached, switching, through the moving system, a movement of the robot to a second speed lower than the first speed, controlling, by the master controller, the rotating telescopic apparatus according to information of a second pressure sensor connected to the mobile ultrasonic rapid inspection system during an operation of the mobile ultrasonic rapid inspection system, to maintain that the ball type ultrasonic probes have the joint force that is the same and stable moving the robot to another defect position at the first speed when the inspection for each defect is completed, maintaining the robot at the second speed during the inspection process, and moving the robot back to an original point after inspections of all the defects are completed, to complete the fine inspection of the defect region; and processing, by using a deep learning-based recognition method, data obtained by the mobile ultrasonic rapid inspection system, recognizing positions and categories of internal defects by using a deformable convolution-based deep neural network for inspection, and continuously imaging internal defects from a plurality of sets of ultrasonic inspection data by using an "inversion-recognition" multi-task deep neural network fused with time sequence information.

10. The working method of the wall-climbing robot system for rapid nondestructive inspection of hidden defects in culverts and sluices according to claim 9, further comprising performing simultaneous concrete permittivity inversion and defect recognition by:

extracting an actual transmitted wavelet signal from a ground-penetrating radar device in different application scenarios, and performing forward modeling by using the wavelet signal as a source wavelet signal of simulation modeling, to generate a corresponding ground-penetrating radar profile, the ground-penetrating radar profile forming a data pair with an established permittivity distribution map and a target category label, to constitute a simulated training data set;

constructing a ground-penetrating radar intelligent inversion and recognition model, and training the ground-penetrating radar intelligent inversion and recognition model based on the simulated training data set;

establishing a real training data set, and fine adjusting the ground-penetrating radar intelligent inversion and recognition model based on the real training data set and a transfer learning method; and performing permittivity inversion and defect recognition by using the fine adjusted ground-penetrating radar intelligent inversion and recognition model.

11. The working method of the wall-climbing robot system for rapid nondestructive inspection of hidden defects in culverts and sluices according to claim 10, wherein the extracting an actual transmitted wavelet signal for a ground-penetrating radar device in the different application scenarios, and performing forward modeling by using the wavelet signal as a source wavelet signal of simulation modeling comprises the following specific steps:

determining a ground-penetrating radar device for the different application scenarios, extracting an air-mined direct wave of the ground-penetrating radar device as a wavelet, and performing forward modeling on each pair of permittivity distribution map by using a Ricker wavelet with a frequency and a phase being consistent with a wavelet of the ground-penetrating radar device as a source wavelet for modeling, to generate a corresponding ground-penetrating radar profile.

12. The working method of the wall-climbing robot system for rapid nondestructive inspection of hidden defects in culverts and sluices according to claim 10, wherein a specific process that the ground-penetrating radar profile forms a data pair with an established permittivity distribution map and a target category label comprises: randomly superimposing background noise measured in the different application scenarios onto simulated radar detection data, to obtain simulated data with a background and a wavelet close to those in reality; and establishing two labels of the permittivity distribution map and the target category label, to obtain a data pair of "Ground-penetrating radar profile-Permittivity distribution map and/or Target category label".

13. The working method of the wall-climbing robot system for rapid nondestructive inspection of hidden defects in culverts and sluices according to claim 10, wherein the ground-penetrating radar intelligent inversion and recognition model comprises a local short survey line spatial feature extraction structure, a long survey line spatial-temporal feature interaction structure, and a permittivity inversion and target recognition dual-task structure that are cascaded.

14. The working method of the wall-climbing robot system for rapid nondestructive inspection of hidden defects in culverts and sluices according to claim 13, wherein the local short survey line spatial feature extraction structure uses a plurality of parallel fully convolutional network structures, each fully convolutional network structure is used for separately processing local short survey line B-Scan profiles extracted from different positions in a continuous survey line of an arbitrary length, and the spatial context feature extraction is performed on the profiles, to form a feature sequence of arbitrary length-continuous survey line ground-penetrating radar detection data.

15. The working method of the wall-climbing robot system for rapid nondestructive inspection of hidden defects in culverts and sluices according to claim 13, wherein the long survey line spatial-temporal feature interaction structure uses a one-layer Bi-ConvLSTM structure to implement bidirectional spatial-temporal information fusion in a local short survey line B-Scan profile feature sequence, and through adaptive information fusion of a local short survey line B-Scan feature in a forward direction of a ground-penetrating radar detection direction and a reverse direction of the ground-penetrating radar detection direction, generates an enhanced feature sequence comprising spatial context information between the local short survey line B-Scan profiles, to implement inversion or recognition of a concrete internal target having a continuous shape, a category, and a permittivity value.

16. The working method of the wall-climbing robot system for rapid nondestructive inspection of hidden defects in culverts and sluices according to claim 13, wherein the permittivity inversion and target recognition dual-task structure uses a plurality of parallel two-branch convolutional network structures, each parallel two-branch convolutional network structure being used for separately processing an enhanced feature of each local short survey line B-Scan profile extracted by the long survey line spatial-temporal feature interaction structure, and simultaneously reconstructs concrete permittivity distribution and recognizes defect categories, positions, and contours.

17. The working method of the wall-climbing robot system for rapid nondestructive inspection of hidden defects in culverts and sluices according to claim 10, wherein a specific process of establishing a real training data set comprises: performing corresponding random clipping and bilinear interpolation in a horizontal direction on continuous survey line ground-penetrating radar profile data actually inspected by a ground-penetrating radar, a permittivity model established according to an actual site, and a target category label to enhance data, to establish the real training data set.

18. The wall-climbing robot system for rapid nondestructive inspection of hidden defects in culverts and sluices according to claim 1, wherein the corrosion inspection system observes a corrosion status of steel bars in concrete by using a ground-penetrating radar-based two-step staggered inspection mode, and the corrosion inspection system is configured to:
   obtain a radar survey line profile through walking in any direction, and determine an arrangement direction of the steel bars by using a deep neural network-based rapid positioning algorithm for steel bars; and
   perform scanning in the arrangement direction of the steel bars, and determine a corrosion degree and a corrosion position of a current position by using a change in a feature parameter at a different position.

\* \* \* \* \*